United States Patent [19]

Hosoi et al.

[11] Patent Number: 4,690,977

[45] Date of Patent: Sep. 1, 1987

[54] VINYL CHLORIDE POLYMER COMPOSITION

[75] Inventors: Hideki Hosoi, Kobe; Toshihiko Hasegawa, Hyogo; Taizo Aoyama, Himeji, all of Japan

[73] Assignee: Kanegafuchi Kagaku Kogyo Kabushiki Kaisha, Osaka, Japan

[21] Appl. No.: 897,968

[22] Filed: Aug. 20, 1986

Related U.S. Application Data

[62] Division of Ser. No. 721,001, Apr. 8, 1985, Pat. No. 4,645,795.

[30] Foreign Application Priority Data

Apr. 12, 1984 [JP] Japan .................................. 59-74630

[51] Int. Cl.$^4$ .................... C08L 51/04; C08L 57/08
[52] U.S. Cl. ........................... 525/83; 525/70; 525/71; 525/82; 525/85; 525/86; 525/232; 525/310
[58] Field of Search ................. 525/70, 71, 83, 85

[56] References Cited

U.S. PATENT DOCUMENTS

| | | | |
|---|---|---|---|
| 3,264,373 | 8/1966 | Whitworth et al. | 525/75 |
| 4,376,843 | 3/1983 | Linder et al. | 525/83 |
| 4,511,695 | 4/1985 | Linder et al. | 525/83 |
| 4,567,234 | 1/1986 | Meunier | 525/85 |
| 4,634,734 | 1/1987 | Hambrecht et al. | 525/85 |

FOREIGN PATENT DOCUMENTS

0050848 5/1982 European Pat. Off. ............. 525/75

*Primary Examiner*—Jacob Ziegler
*Attorney, Agent, or Firm*—Armstrong, Nikaido, Marmelstein & Kubovcik

[57] ABSTRACT

A vinyl chloride polymer composition comprising
(A) 3 to 50 parts by weight of a grafted copolymer and
(B) 97 to 50 parts by weight of a vinyl chloride polymer, a total amount of the copolymer (A) and the polymer (B) being 100 parts by weight; the grafted copolymer (A) comprising
(1) 50 to 80 parts by weight of a rubber copolymer and
(2) 50 to 20 parts by weight of a grafting monomer, a total amount of the component (1) and the component (2) being 100 parts by weight; the component (1) comprising
(a) 60 to 90% by weight of the rubber copolymer comprising 99 to 85% by weight of alkyl acrylate having an alkyl group of 2 to 8 carbon atoms, 1 to 15% by weight of conjugated diolefin and 0 to 5% by weight of polyfunctional cross-linking agent and
(b) 40 to 10% by weight of a surface rubber copolymer comprising 98 to 70% by weight of alkyl acrylate having an alkyl group of 2 to 8 carbon atoms, 2 to 30% by weight of conjugated diolefin and 0 to 5% by weight of polyfunctional cross-linking agent and being obtained by polymerizing the component (a) to give a core rubber copolymer and then polymerizing the surface rubber copolymer component (b) in the presence of the core rubber copolymer (a), and a ratio of conjugated diolefin to acrylate in the surface rubber copolymer (b) is larger than a ratio of conjugated diolefin to acrylate in the core rubber copolymer (a) and the component (2) comprising
(i) 30 to 95% by weight of methyl methacrylate and
(ii) 70 to 5% by weight of at least one monomer selected from the group consisting of unsaturated nitrile, aromatic vinyl compound, alkyl acrylate having an alkyl group of 1 to 8 carbon atoms and alkyl methacrylate having an alkyl group of 2 to 4 carbon atoms. The vinyl chloride polymer composition has excellent impact resistance, weatherability and processability.

5 Claims, No Drawings

VINYL CHLORIDE POLYMER COMPOSITION

This is a division of application Ser. No. 721,001, filed Apr. 8, 1985, now U.S. Pat. No. 4,645,795.

BACKGROUND OF THE INVENTION

The present invention relates to a vinyl chloride polymer composition having excellent impact-resistance, weatherability and processability.

It hitherto has been well known that vinyl chloride polymer has excellent various properties, but has a disadvantage that impact-resistance is poor.

The so-called MBS resin obtained by graft-polymerizing methyl methacrylate, styrene, acrylonitrile, or the like, onto a butadiene rubber is widely employed as a reinforcing agent for improving an impact-resistance of vinyl chloride polymer. When MBS resin is employed as a reinforcing agent, an effect of improving the impact-resistance to vinyl chloride polymer is excellent, but double-bond of butadiene unit included in a butadiene rubber is readily deteriorated under ultraviolet light, and therefore the weatherability of vinyl chloride polymer becomes remarkably poor and it is difficult that the vinyl chloride polymer is practically employed in the outdoors.

In order to eliminate the above disadvantage that the weatherability is poor, there are proposed various methods that methyl methacrylate, styrene, acrylonitrile, or the like, is graft-polymerized onto cross-linked alkyl acrylate polymer. According to the above methods, the weatherability of vinyl chloride polymer becomes more excellent, but it is unsatisfy to improve the impact-resistance of vinyl chloride polymer. Particularly, the strength of vinyl chloride polymer cannot be increased when vinyl chloride polymer is low-kneaded with the above components. That is to say, the processability of vinyl chloride polymer is poor. The reason why the processability is poor is considered that cross-linked alkyl acrylate polymer does not have an active site for grafting, capable of graft-polymerizing onto cross-linked alkyl acrylate when the monomers are graft-polymerized onto cross-linked alkyl acrylate, unlike the case of MBS resin.

There is also proposed a method employing cross-linkable agents in which reactivities of functional groups are different. According to the above method, the impact-resistance of vinyl chloride polymer is unsatisfactorily improved.

On the other hand, there are various methods that styrene, methyl methacrylate, acrylonitrile, or the like, is graft-polymerized into a cross-linked alkyl acrylate-conjugated diolefin rubber copolymer, in which an active site for grafting is provided onto a conjugated diolefin, as in case of MBS resin. According to the above methods, the impact-resistance and processability are improved in comparison with a method employing cross-linked alkyl acrylate polymer as a rubber polymer, but the weatherability tends to become poor, because of existing conjugated diolefin in the rubber copolymer.

And also there is provided a method that the weatherability is not made poor by employing a rubber polymer, as above-mentioned. In the above method, an alkyl acrylate is copolymerized with a small amount of conjugated diolefin such that the weatherability is not made poor and the obtained copolymer is employed as a rubber copolymer. According to this method, the weatherability is improved, but the impact-resistance is unsatisfactorily improved. That is to say, as known, an effect of improving the impact resistance is increased with increasing a content of conjugated diolefin in rubber copolymer, but an effect of improving the weatherability lowers. On the other hand, an effect of improving the weatherability is increased with decreasing a content of conjugated diolefin in rubber copolymer, an effect of improving the impact-resistance lowers.

An object of the present invention is to provide a grafted copolymer having an excellent effect of improving the impact-resistance to vinyl chloride polymer by employing a small amount of a conjugated diolefin.

A further object of the invention is to provide a vinyl chloride polymer composition having an excellent impact-resistance, processability and weatherability.

SUMMARY OF THE INVENTION

In the present invention, there is provided a vinyl chloride copolymer composition comprising 3 to 50 parts by weight (hereinafter referred to as "part") of a grafted copolymer and 97 to 50 parts of a vinyl chloride polymer, a total amount of the grafted copolymer and vinyl chloride polymer being 100 parts; the grafted copolymer comprising 50 to 80 parts of a rubber copolymer and 50 to 20 parts of a grafting monomer, a total amount of the rubber copolymer and the grafting monomer being 100 parts; the rubber copolymer comprising 60 to 90% by weight (hereinafter referred to as "%") of a core rubber copolymer comprising 99 to 85% of alkyl acrylate having an alkyl group of 2 to 8 carbon atoms, 1 to 15% of conjugated diolefin and 0 to 5% of polyfunctional cross-linking agent and 40 to 10% by weight of a surface rubber copolymer comprising 98 to 70% of alkyl acrylate having an alkyl group of 2 to 8 carbon atoms, 2 to 30% of conjugated diolefin and 0 to 5% of polyfunctional cross-linking agent and being obtained by polymerizing the core rubber copolymer and then polymerizing the surface rubber copolymer in the presence of the core rubber copolymer, and a ratio of conjugated diolefin to acrylate in the surface rubber copolymer is larger than a ratio of conjugated diolefin to acrylate in the core rubber copolymer and the grafting monomer comprising 30 to 95% of methyl methacrylate and 70 to 5% of at least one monomer selected from the group consisting of unsaturated nitrile, aromatic vinyl compound, alkyl acrylate having an alkyl group of 1 to 8 carbon atoms alkyl group and alkyl methacrylate having an alkyl group of 2 to 4 carbon atoms.

DETAILED DESCRIPTION

In the invention, the rubber copolymer is prepared by the two-stage polymerization so that the core rubber copolymer comprising a small amount of conjugated diolefin and an alkyl acrylate is first prepared and then the surface rubber copolymer having a high ratio of conjugated diolefin to the alkyl acrylate in comparison with the ratio of core rubber copolymer is prepared by polymerizing a conjugated diolefin with an alkyl acrylate monomer in the pressure of the core rubber copolymer. The impact-resistance of vinyl chloride polymer employing the rubber copolymer of the present invention is extremely increased in comparison with employing the conventional cross-linkable alkyl acrylate-conjugated diolefin rubber copolymer having equal amount of conjugated diolefin to the rubber copolymer of the invention.

In case that the rubber copolymer comprising the core rubber copolymer and the surface rubber copolymer which has a small amount of conjugated diolefin is employed with vinyl chloride polymer, there can be increased an impact-resistance the same as in case employing a large amount of conjugated diolefin, in spite of employing a small amount of conjugated diolefin, in comparison with the conventional rubber copolymer comprising cross-linkable alkyl acrylate conjugated diolefin.

It is essential that the grafted component graftpolymerized onto the rubber copolymer of the invention is compatible with vinyl chloride polymer from the viewpoint of giving the impact-resistance of vinyl chloride polymer. Methyl methacrylate is known as a compatible component with vinyl chloride polymer. However, in case that methyl methacrylate is graft-polymerized alone onto the rubber copolymer of the invention, the impact-resistance is not enough, when vinyl chloride polymer is low-kneaded with the obtained grafted copolymer. Accordingly, high-kneading or enough-kneading is necessary to obtain a sufficient impact-resistance. The necessity of high-kneading or enough-kneading results in poor processability. The processability can be extremely improved by copolymerizing a small amount of unsaturated nitrile, aromatic vinyl compound, alkyl acryalte, alkyl methacrylate except for methyl methacrylate together with methyl methacrylate. That is to say, when the grafted copolymer of the invention obtained by graft-polymerizing a grafting monomer component onto the rubber copolymer of the invention is admixed with vinyl chloride polymer, the vinyl chloride polymer having an excellent impact-resistance is prepared in either case that vinyl chloride polymer is high-kneaded or low kneaded with the grafted copolymer.

The rubber copolymer employed in the present invention is prepared in a usual emulution-polymerization by employing an alkyl acrylate having an alkyl group of 2 to 8 carbon atoms and a conjugated diolefin, and as occasion demands, a polyfunctional cross-linking agent to give a core rubber copolymer, and then in further polymerization to give a surface rubber copolymer.

The alkyl group which forms alkyl acrylate having an alkyl group of 2 to 8 carbon atoms, in the invention, may be a linear or branched one. Examples of the alkyl acrylate are, for instance, ethyl acrylate, propyl acrylate, n-butyl acrylate, isobutyl acrylate, pentyl acrylate, hexyl acrylate, n-octyl acrylate, 2-ethylhexyl acrylate, and the like. These monomers can be employed alone or in the admixture thereof.

Typical examples of the conjugated diolefin monomer to be copolymerized with alkyl acrylate are, for instance, 1,3-butadiene, isoprene, and the like. These monomers can be employed alone or in the admixture thereof.

In the invention, as afore-mentioned, it is necessary that the rubber copolymer is prepared by at least two-stage polymerization, that is to say, the core rubber copolymer is first prepared by polymerization and then the surface rubber copolymer is obtained by polymerization in the presence of the above core rubber copolymer. And further, it is necesary that a ratio of conjugated diolefin to alkyl acrylate in the surface rubber copolymer is higher than that in the core rubber copolymer. The core rubber copolymer comprises 99 to 85%, preferably 99 to 90% of the above alkyl acrylate and 1 15%, preferably 1 to 10% of conjugated diolefin, and as occasion demands, 0 to 5% of polyfunctional cross-linking agent. The monomer components in the surface rubber copolymer to be polymerized onto the core rubber copolymer are 98 to 70%, preferably 94 to 70% of alkyl acrylate and 2 to 30%, preferably 6 to 30% of conjugated diolefin, and as occasion demands, 0 to 5% of polyfunctional cross-linking agent. A ratio of diolefin to alkyl acrylater in the surface rubber copolymer of more than 30 % is not preferable from the viewpoint of an effect of improving the weatherability. And further, a ratio of diolefin to alkyl acryalte in the surface rubber copolymer of less than 2% is not preferable from the viewpoint of an effect of improving the impact-resistance. This thing is assumed as is decreasing active site for grafting. On the other hand, it is preferable that a ratio of conjugated diolefin to alkyl acrylate in the surface rubber copolymer is larger than a ratio of conjugated diolefin to alkyl acryalte in the core rubber copolymer from the viewpoint of an effect of improving the impact-resistance. It is preferable to more than 3%, more preferably more than 5%. In case that a ratio of conjugated diolefin to alkyl acrylate in the surface rubber copolymer is less than a ratio of conjugated diolefin to alkyl acrylate in the core rubber copolymer, it is not practical since an effect of improving the impact-resistance lowers.

The rubber copolymer of the invention is prepared by polymerizing 60 to 90%, preferably 70 to 90%of core rubber copolymer and 40 to 10%, preferably 30 to 10% of surface rubber copolymer. In case that an amount of the surface rubber copolymer is less than 10%, it is not preferable since an effort of improving the impact-resistance lowers. On the other hand, in case that the above amount is more than 40%, it is not preferable since the weatherability tends to lower.

It is necessary that the grafting monomers of the invention, which are polymerized onto the rubber copolymer, are enough selected. It is important that the grafting monomers are compatible with vinyl chloride polymer from the viewpoint of getting an effect of improving the impact-resistance. Methyl methacrylate is well-known as a typical example of the component being compatible with vinyl chloride polymer.

In case that only methyl methacrylate is graftpolymerized onto the rubber copolymer to give the grafted copolymer, a vinyl chloride polymer having a satisfactory impact-resistance is obtained by means of high-kneading, such as roll-processing, of the grafted copolymer and vinyl chloride polymer. However, when the grafted copolymer is low-kneaded, such as pipe-processing with vinyl chloride polymer, it is very difficult that the obtained vinyl chloride polymer is employed for practical use, because it is difficult that the thus obtained grafted copolymer gives an effect of improving the impact-resistance to vinyl chloride polymer. In the invention, it is essential to employ methyl methacrylate for getting the impact-resistance to vinyl chloride polymer. On the other hand, it is necessary that at least one of monomer selected from the group consisting of unsaturated nitrile, aromatic vinyl compound, alkyl acrylate and alkyl methacrylate except for methyl methacrylate is copolymerized together with methyl methacrylate for further increasing an effect of improving the impact-resistance in case that vinyl chloride polymer is low-kneaded with the grafted-copolymer.

In the invention, a grafting monomer component to be graft-polymerized onto the rubber copolymer comprises 30 to 95%, preferably 40 to 90% of methyl methacrylate and 5 to 70%, preferably 10 to 60% of at least one monomer selected from the group consisting of unsaturated nitrile, aromatic vinyl compound, alkyl acrylate having an alkyl group of 1 to 8 carbon atoms and alkyl methacrylate having an alkyl group of 2 to 4 carbon atoms. In case that an amount of methyl methacrylate among grafting monomers is less than 30%, it is not preferable because of lowering of the effect of improving the impact-resistance. On the other hand, the above amount of methyl methacrylate is more than 95%, it is not preferable that the effect of giving the impact-resistance is a little.

Typical examples of the above aromatic vinyl compound is styrene, and the others are vinyl toluene and α-methyl styrene. Examples of the unsaturated nitrile are, for instance, acrylonitrile, methacrylonitrile, and the like. Examples of the alkyl acrylate are, for instance, ethyl acrylate, methyl acrylate, n-butyl acrylate, and the like. Examples of the alkyl methacrylate are, for instance, ethyl methacrylate, n-butyl methacrylate, and the like.

A monomer selected from the group consisting of styrene, acrylonitrile, ethyl methacrylate, n-butyl methacrylate and n-butyl acrylate is extremely preferable as a monomer component to be copolymerized together with methyl methacrylate. An effect for improving the strength into vinyl chloride polymer becomes high by employing the above monomer when vinyl chloride polymer is low-kneaded without impairing an excellent compatibility to vinyl chloride polymer, which is given by employing methyl methacrylate.

On the other hand, as components capable of giving an excellent compatibility to vinyl chloride polymer, various components such as aromatic vinyl compound and unsaturated nitrile copolymer other than methyl methacrylate compolymer have been known. The various methods are proposed to improve the processability of vinyl chloride polymer by skillfully combining the above component giving an excellent comparibility and methyl methacrylate or selecting an order adding to vinyl chloride polymer when the components are polymerized.

When those known graft-polymerization method is employed for the rubber copolymer of the invention, it is preferable since the processability of vinyl chloride polymer is improved and the excellent property of the rubber copolymer appears. For instance, it is preferable to graft-polymerize a monomer mixture comprising 30 to 95% of methyl methacrylate and 5 to 70% of at least one monomer selected from the group consisting of unsaturated nitrile, aromatic vinyl compound, alkyl acrylate having an alkyl group of 1 to 8 carbon atoms and alkyl methacrylate having an alkyl group of 2 to 4 carbon atoms onto the rubber copolymer without changing any kind of components of monomer mixture. And further, it is more preferable that a monomer mixture including not less than 30% of methyl methacrylate is copolymerized at the finishing stage of copolymerization from the viewpoint of effects of improving the processability and impact-resistance.

That is to say, in the graft-polymerization method of the grafted copolymer of the invention, 5 to 30 parts, preferably 10 to 25 parts of a monomer mixture comprising 50 to 90%, preferably 60 to 80% of aromatic vinyl compound and 10 to 50%, preferably 20 to 40% of unsaturated nitrile, 0 to 40%, preferably 0 to 20% of alkyl methacrylate having an alkyl group of 1 to 4 carbon atoms and 0 to 40%, preferably 0 to 20% of alkyl acrylate having an alkyl group of 1 to 8 carbon atoms is first graft-polymerized onto 50 to 80 parts, preferably 60 to 75 parts of the rubber copolymer; and then 5 to 30 parts, preferably 10 to 25 parts of a monomer mixture comprising 30 to 95%, preferably 40 to 90% of methyl methacrylate and 5 to 70%, preferably 10 to 60% of at least one monomer selected from the group consisting of unsaturated nitrile, aromatic vinyl compound, alkyl acrylate having an alkyl group of 1 to 8 carbon atoms and alkyl methacrylate having an alkyl group of 2 to 4 carbon atoms is secondly graft-polymerized to give the grafted copolymer. A total amount of the rubber copolymer, the first graft-polymerized monomer mixture and the second graft-polymerized monomer mixture is 100 parts. On the other hand, 5 to 30 parts, preferably 10 to 25 parts of a monomer mixture comprising 30 to 95%, preferably 40 to 90% of methyl methacrylate and 5 to 70%, preferably 10 to 60% of at least one monomer selected from the group consisting of unsaturated nitrile, aromatic vinyl compound, alkyl acrylate having an alkyl group of 1 to 8 carbon atoms and alkyl methacrylate having an alkyl group of 2 to 4 carbon atoms is first graft-polymerized onto 50 to 80 parts, preferably 60 to 75 parts of the rubber copolymer; and then 5 to 30 parts, preferably 10 to 25 parts of a monomer mixture comprising 50 to 90%, preferably 60 to 80% of aromatic vinyl compound, 10 to 50%, preferably 20 to 40% of unsaturated nitrile, 0 to 40%, preferably 0 to 20% of alkyl methacrylate having an alkyl group of 1 to 4 carbon atoms and 0 to 40%, preferably 0 to 20% of alkyl acrylate having an alkyl group of 1 to 8 carbon atoms is secondly graft-polymerized to give the grafted copolymer. A total amount of the rubber copolymer, the first graft-polymerized monomer mixture and the second graft-polymerized monomer mixture is 100 parts. In case that the grafted copolymer obtained by above-mentioned polymerization method is kneaded with vinyl chloride polymer, it is more preferable since the impact-resistance is extremely improved and excellent properties of the rubber copolymer appear, even if the grafted copolymer is low-kneaded with vinyl chloride polymer as in pipe-processing.

The grafted copolymer is prepared by graft-polymerization with 50 to 20 parts, preferably 40 to 25 parts of grafting monomer onto 50 to 80 parts, preferably 60 to 75 pats of the rubber copolymer. A total amount of the rubber copolymer and grafting monomers is 100 parts. In case that an amount of the rubber copolymer is less than 50 parts, it is not practical that the effect of improving the impact-resistance is poor. On the other hand, in case that an amount of the rubber copolymer is more than 80 parts, it is difficult that the rubber copolymer is uniformly kneaded with vinyl chloride polymer because the rubber copolymer is aggregated at the time of salting-out, aciding-out or drying the prepared grafted copolymer.

The thus obtained grafted copolymer latex is subjected to salting-out or aciding-out, and filtration, washing and drying to give the grafted copolymer. In the time of depositing, a conventional antioxidant or ultraviolet absorbent may be added.

The obtained grafted copolymer is kneaded with vinyl chloride polymer to give the viny chloride polymer compositon of the invention. "Vinyl chloride polymer" in the instant specification is included vinyl chloride homopolymer, vinyl chloride copolymer having not less than 70% of vinyl chloride and the derivatives thereof such as chlorinated polyvinyl chloride.

An amount of the grafted copolymer to vinyl chloride polymer is different depending upon the use. In general, the amount is 3 to 50 parts of the grafted copolymer to 97 to 50 parts of vinyl chloride polymer.

The present invention is more specifically described and explained by means of the following Examples. It is to be understood that the present invention is not limited to Exampes, and various changes and modifications may be made in the invention without departing from the spirit and scope thereof.

EXAMPLE 1

(A) Preparation of a core rubber copolymer

After a space in stainless reactor was thoroughly displaced with nitrogen gas, the reactor was charged with the following components and the polymerization was carried out at 40° C. for 10 hours.

| | |
|---|---|
| Deionized water | 250 parts |
| n-Butyl acrylate | 94 parts |
| Butadiene | 6 parts |
| p-Menthane hydroperoxide | 0.05 part |
| Sodium formaldehyde sulfoxylate | 0.05 part |
| Di-sodium salt of ethylenediamine-tetrahydroacetic acid (hereinafter referred to as "Di-sodium salt of EDTA") | 0.003 part |
| Ferrous sulfate (FeSO$_4$.7H$_2$O) | 0.0015 part |
| Tri-potassium phosphate | 0.4 part |
| Sodium oleate | 2.5 parts |

At five hours after the beginning of polymerization, 0.03 part of p-menthanehydroperoxide was added to the polymerization mixture. A conversion of the obtained latex was 96% and an average particle diameter was 1000 Å.

(B) Preparation of a rubber copolymer

After a space in autoclave was thoroughly displaced with nitrogen gas, the autoclave was charged with the following components and the polymerization was carried out at 40° C. for 6 hours.

| | |
|---|---|
| Deionized water | 250 parts |
| The core rubber copolymer obtained in (A) | 80 parts |
| n-Butyl acrylate | 16.8 parts |
| Butadiene | 3.2 parts |
| p-Menthane hydroperoxide | 0.003 part |
| Sodium formaldehyde sulfoxylate | 0.03 part |
| Di-sodium salt of EDTA | 0.003 part |
| Ferrous sulfate (FeSO$_4$.7H$_2$O) | 0.0015 part |
| Tri-potassium phosphate | 0.1 part |

There was added 1% aqueous solution including 0.75 part of sodium oleate for 3 hours from the beginning of the polymerization. At 5 hours after the beginning of the polymerization, 0.03 part of p-menthane hydroperoxide was added to the polymerization mixture. A conversion of the obtained latex was 96% and average an particle diameter was 1100 Å.

(C) Preparation of a grafted copolymer

| | |
|---|---|
| Rubber copolymer latex obtained in (B) | 65 parts (solid) |
| Deionized water | 200 parts |
| Sodium formaldehyde sulfoxylate | 0.4 part |
| Di-sodium salt of EDTA | 0.01 part |
| Ferrous sulfate (FeSO$_4$.7H$_2$O) | 0.005 part |

A reactor was charged with the above-mentioned components and a space in reactor was thoroughly displaced with nitrogen gas while maintaining at 60° C. After adding 0.13 part of hydrogen chloride (as 0.33% aqueous hydrochloric acid solution) to the solution, 2% sodium hydroxide solution was added to the mixture to make stable. An average particle diameter of the rubber copolymer latex was 1600 Å.

And then the following components were added to the obtained latex for 4 hours and further the polymerization was carried out for 1 hour. A conversion of the grafted copolymer latex was 97%.

| | |
|---|---|
| Methyl methacrylate | 25 parts |
| Styrene | 8 parts |
| Acrylonitrile | 2 parts |
| Cumene hydroperoxide | 0.3 part |

There was added 0.5 part of 2,4-dimethyl-6-t-butylphenol into the obtained grafted copolymer latex, and salting-out was carried out. Thereafter, the latex was dehydrated and dried to give the desired grafted copolymer.

The obtained grafted copolymer was mixed with vinyl chloride polymer and other additives according to Formulation 1 and the obtained composition was molded into a vinyl chloride polymer pipe having a diameter of one inch by employing a biaxial extruder having a diameter of 80 mm.

A falling impact-strength of the obtained pipe was measured by means of the following method.

The results are shown in Table 1.

And further, the obtained composition was roll-kneaded for 5 minutes at 160° C. and compression-molded for 15 minutes by employing a heat-press of 180° C. according to Formulation 2 to prepare a sample for Izot impact test. Then, the sample was treated with a weather-o-meter and Izot impact-strength of the sample was measured by means of the following method.

The results are shown in Table 1.

[Formulation 1]

| | |
|---|---|
| Vinyl chloride polymer ($\bar{P}$ = 1,000) | 100 parts |
| Grafted copolymer | 7 parts |
| Lead stabilizer | 2 parts |
| Calcium stearate | 1 part |
| Wax lubricant | 0.5 part |

[Formulation 2]

| | |
|---|---|
| Vinyl chloride polymer ($\bar{P}$ = 1,000) | 100 parts |
| Grafted copolymer | 13 parts |
| Dibutyltinmercaptide | 2 parts |
| Epoxidized soybean oil | 1 part |
| Wax lubricant | 0.5 parts |

(Falling impact strength)

A mean-broken height of one inch pipe is measured at 0° C. by employing a weight having a flat bottom.

(Izot impact-strength)

After carrying out a weathering test of the obtained sample by employing a sunshine-weather-o-meter (made by Toyo Seiki Kabushiki Kaisha) under a condition of a black-panel temperature of 63° C. and a rainfall of 12 minutes per 2 hours Izot impact-strength is measured at 23° C. according to JIS K 7110.

EXAMPLES 2 AND 3 AND COMPARATIVE EXAMPLES 1 TO 3

The procedure of Example 1 was repeated except that ratios of the core rubber copolymer and the surface rubber copolymer in the rubber copolymer and each ratio of n-butyl acrylate and butadiene in the core rubber copolymer or the surface rubber copolymer were changed as shown in Table 1 to give grafted copolymers. And then, the obtained copolymers were admixed with vinyl chloride polymer to prepare samples. Physical properties of the obtained samples were measured.
The results are shown in Table 1.

for 1 hour. A conversion of the grafted copolymer was 96%.

| Methyl methacryalte | 14 parts |
| Styrene | 4 parts |
| Acrylonitrile | 2 parts |
| Cumene hydroperoxide | 0.2 part |

Thereto there were added the follwoing components for 2 hours and the polymerization was carried out for 1 hour. An conversion of the obtained grafted copolymer was 98%.

| Methyl methacryalte | 13 parts |
| n-Butyl acrylate | 2 parts |
| Cumene hydroperoxide | 0.2 part |

TABLE 1

| | Rubber copolymer | | | | |
|---|---|---|---|---|---|
| | Ratio of conjugated diolefin to acrylate in the core rubber copolymer (%) | | Ratio of the core rubber copolymer in the rubber copolymer (%) | Ratio of conjugated diolefin to acrylate in the surface rubber copolymer (%) | |
| | BA(1) | BD(2) | | BA(1) | BD(2) |
| Ex. 1 | 94 | 6 | 80 | 84 | 16 |
| Ex. 2 | 96 | 4 | 80 | 76 | 24 |
| Ex. 3 | 93 | 7 | 80 | 88 | 12 |
| Com. Ex. 1 | 92 | 8 | 100 | — | — |
| Com. Ex. 2 | 92 | 8 | 80 | 92 | 8 |
| Com. Ex. 3 | 91 | 9 | 80 | 96 | 4 |

| | Physical properties | | | | | | |
|---|---|---|---|---|---|---|---|
| | Ratio of the surface rubber copolymer in the rubber copolymer (%) | Falling cone impact strength (cm) (Mean-broken height of one inch pipe) | Izot impact-strength (kgcm/cm²) | | | | |
| | | | 0 | 100 | 200 | 300 | 400 |
| | | | (Irradiation time of sunshine weather-o-meter(hr.)) | | | | |
| Ex. 1 | 20 | 250 | 90 | 80 | 70 | 50 | 30 |
| Ex. 2 | 20 | 270 | 130 | 90 | 65 | 40 | 20 |
| Ex. 3 | 20 | 220 | — | — | — | — | — |
| Com. Ex. 1 | — | 150 | 50 | 40 | 30 | 25 | 15 |
| Com. Ex. 2 | 20 | 170 | — | — | — | — | — |
| Com. Ex. 3 | 20 | 160 | — | — | — | — | — |

(1) BA: n-Butyl acrylate
(2) BD: Butadiene

EXAMPLE 4

| The rubber copolymer latex obtained in Example 1 | 65 parts (solid) |
| Deionized water | 200 parts |
| Sodium formaldehyde sulfoxylate | 0.4 part |
| Di-sodium salt of EDTA | 0.01 part |
| Ferrous sulfate (FeSO$_4$.7H$_2$O) | 0.005 part |

A reactor was charged with the above components. An aggregation and stabilization of the components were carried out in the same manner as in Example 1. Thereto the following components were added for 2 hours and further the polymerization was carried out The obtained grafted copolymer was molded into a vinyl chloride polymer pipe having a diameter of one inch in the same manner as in Example 1 and a falling impact-strength was measured.

EXAMPLES 5 TO 7 AND COMPARATIVE EXAMPLE 4

The procedure of Example 4 was repeated except that the grafting monomers shown in Table 2 were employed. The obtained grafted copolymer were kneaded with vinyl chloride polymer, and the samples of vinyl chloride polymer compositions were prepared and the physical properties were measured.
The results are shown in Table 2.

TABLE 2

| | Grafting monomers in the first polymerization (part) | | | Grafting monomers in the second polymerization (part) | | | | | Falling impact-strength (cm) (Mean-broken height of one inch pipe) |
|---|---|---|---|---|---|---|---|---|---|
| | MMA(1) | ST(2) | AN(3) | MMA(1) | ST(2) | AN(3) | BA(4) | BMA(5) | |
| Ex. 1 | 25 | 8 | 2 | — | — | — | — | — | 250 |
| Ex. 4 | 14 | 4 | 2 | 13 | — | — | 2 | — | 260 |
| Ex. 5 | — | 11 | 4 | 18 | — | — | 2 | — | 270 |
| Ex. 6 | 18 | 2 | — | — | 11 | 4 | — | — | 230 |
| Ex. 7 | — | 11 | 4 | 16 | — | — | — | 4 | 250 |
| Com. Ex. 4 | 35 | — | — | — | — | — | — | — | 130 |

(1)MMA: Methyl methacrylate
(2)ST: Styrene
(3)AN: Acrylonitrile
(4)BA: n-Butyl acrylate
(5)BMA: n-Butyl methacrylate

What we claim is:

1. A vinyl chloride polymer composition comprising:
   (A) 3 to 50 parts by weight of a grafted copolymer, and
   (B) 97 to 50 parts by weight of a vinyl chloride polymer, the total amount of said copolymer (A) and said polymer (B) being 100 parts by weight;
   said grafted copolymer (A) comprising:
   (1) 50 to 80 parts by weight of a rubber copolymer, and
   (2) 50 to 20 parts by weight of a grafting monomer graft-polymerized onto said component (1), the total amount of said component (1) and said component (2) being 100 parts by weight;
   said rubber copolymer component (1) comprising:
   (a) 60 to 90% by weight of a core rubber copolymer comprising 99 to 85% by weight of an alkyl acrylate having an alkyl group of 2 to 8 carbon atoms, 1 to 15% by weight of a conjugated diolefin and 0 to 5% by weight of a polyfunctional cross-linking agent, and
   (b) 40 to 10% by weight of a surface rubber copolymer comprising 98 to 70% by weight of an alkyl acrylate having an alkyl group of 2 to 8 carbon atoms, 2 to 30% by weight of a conjugated diolefin and 0 to 5% by weight of a polyfunctional cross-linking agent and being obtained by polymerizing said component (a) to give said core rubber copolymer and then polymerizing said surface rubber copolymer component (b) in the presence of said core rubber copolymer (a), and the ratio of said conjugated diolefin to said alkyl acrylate in said surface rubber copolymer (b) being larger than the ratio of said conjugated diolefin to said alkyl acrylate in said core rubber copolymer (a);
   and said grafting monomer component (2) comprising:
   (i) 30 to 95% by weight of methyl methacrylate, and
   (ii) 70 to 5% by weight of at least one monomer selected from the group consisting of an unsaturated nitrile, an aromatic vinyl compound, an alkyl acrylate having an alkyl group of 1 to 8 carbon atoms and an alkyl methacrylate having an alkyl group of 2 to 4 carbon atoms, and being graft-polymerized onto said rubber copolymer (1) by conducting a graft-polymerization in two stages.

2. The vinyl chloride polymer composition of claim 1, wherein said graft-polymerization in two stages is conducted by dividing said grafting monomer (2) into 5 to 30 parts by weight of a first monomer mixture and 5 to 30 parts by weight of a second monomer mixture, firstly graft-polymerizing said first monomer mixture onto 50 to 80 parts by weight of said rubber copolymer (1) and secondarily graft-polymerizing said second monomer mixture thereon;
   said first monomer mixture comprising 50 to 90% by weight of said aromatic vinyl compound, 10 to 50% by weight of said unsaturated nitrile, 0 to 40% by weight of said alkyl methacrylate having said alkyl group of 2 to 4 carbon atoms and 0 to 40% by weight of said alkyl acrylate having said alkyl group of 1 to 8 carbon atoms, and said second monomer mixture comprising 30 to 95% by weight of methyl methacrylate and 5 to 70% by weight of at least one monomer selected from the group consisting of said unsaturated nitrile, said aromatic vinyl compound, said alkyl acrylate having said alkyl group of 1 to 8 carbon atoms and said alkyl methacrylate having said alkyl group of 2 to 4 carbon atoms.

3. The vinyl chloride polymer composition of claim 1, wherein said graft-polymerization in two stages is conducted by dividing said grafting monomer (2) into 10 to 25 parts by weight of a first monomer mixture and 10 to 25 parts by weight of a second monomer mixture, firstly graft-polymerizing said first monomer mixture onto 60 to 75 parts by weight of said rubber copolymer (1) and secondarily graft-polymerizing said second monomer mixture thereon;
   said first monomer mixture comprising 60 to 80% by weight of said aromatic vinyl compound, 20 to 40% by weight of said unsaturated nitrile, 0 to 20% by weight of said alkyl methacrylate having said alkyl group of 2 to 4 carbon atoms and 0 to 20% by weight of said alkyl acrylate having said alkyl group of 1 to 8 carbon atoms, and said second monomer mixture comprising 40 to 90% by weight of methyl methacrylate and 10 to 60% by weight of at least one monomer selected from the group consisting of said unsaturated nitrile, said aromatic vinyl compound, said alkyl acrylate having said alkyl group of 1 to 8 carbon atoms and said alkyl methacrylate having said alkyl group of 2 to 4 carbon atoms.

4. The vinyl chloride polymer composition of claim 1, wherein said graft-polymerization in two stages is conducted by dividing said grafting monomer (2) into 5 to 30 parts by weight of a first monomer mixture and 5 to 30 parts by weight of a second monomer mixture, firstly graft-polymerizing said first monomer mixture onto 50 to 80 parts by weight of said rubber copolymer (1) and secondarily graft-polymerizing said second monomer mixture thereon;

said first monomer mixture comprising 30 to 95% by weight of methyl methacrylate and 5 to 70% by weight of at least one monomer selected from the group consisting of said unsaturated nitrile, said aromatic vinyl compound, said alkyl acrylate having said alkyl group of 1 to 8 carbon atoms and said alkyl methacrylate having said alkyl group of 2 to 4 carbon atoms, and said second monomer mixture comprising 50 to 90% by weight of said aromatic vinyl compound, 10 to 50% by weight of said unsaturated nitrile, 0 to 40% by weight of said alkyl methacrylate having said alkyl group of 2 to 4 carbon atoms and 0 to 40% by weight of said alkyl acrylate having said alkyl group of 1 to 8 carbon atoms.

5. The vinyl chloride polymer composition of claim 1, wherein said graft-polymerization in two stages is conducted by dividing said grafting monomer (2) into 10 to 25 parts by weight of a first monomer mixture and 10 to 25 parts by weight of a second monomer mixture, firstly graft-polymerizing said first monomer mixture onto 60 to 75 parts by weight of said rubber copolymer (1) and secondarily graft-polymerizing said second monomer mixture thereon;

said first monomer mixture comprising 40 to 90% by weight of methyl methacrylate and 10 to 60% by weight of at least one monomer selected from the group consising of said unsaturated nitrile, said aromatic vinyl compound, said alkyl acrylate having said alkyl group of 1 to 8 carbon atoms and said alkyl methacrylate having said alkyl group of 2 to 4 carbon atoms, and said second monomer mixture comprising 60 to 80% by weight of said aromatic vinyl compound, 20 to 40% by weight of said unsaturated nitrile, 0 to 20% by weight of said alkyl methacrylate having said alkyl group of 2 to 4 carbon atoms and 0 to 20% by weight of said alkyl acrylate having said alkyl group of 1 to 8 carbon atoms.

* * * * *